United States Patent
Liu et al.

(10) Patent No.: US 9,165,310 B2
(45) Date of Patent: Oct. 20, 2015

(54) METHOD AND APPARATUS FOR INTELLIGENT STREET LIGHT ADVERTISEMENT DELIVERY

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Oleg Yurievitch Gusikhin, West Bloomfield, MI (US); David Allen Kowalski, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 175 days.

(21) Appl. No.: 13/833,058

(22) Filed: Mar. 15, 2013

(65) Prior Publication Data

US 2014/0266799 A1   Sep. 18, 2014

(51) Int. Cl.
*G08G 1/00* (2006.01)
*G06Q 30/02* (2012.01)
*G08G 1/08* (2006.01)

(52) U.S. Cl.
CPC ........ *G06Q 30/0259* (2013.01); *G06Q 30/0267* (2013.01); *G06Q 30/0269* (2013.01); *G06Q 30/0272* (2013.01); *G08G 1/08* (2013.01)

(58) Field of Classification Search
CPC ....... G08Q 30/22; G06Q 30/0259; G08B 1/08
USPC .............. 340/928, 905, 909, 914, 917, 995.1, 340/906
See application file for complete search history.

(56) References Cited

U.S. PATENT DOCUMENTS

| | | | |
|---|---|---|---|
| 7,062,778 B1 | 6/2006 | Pattersson | |
| 7,135,993 B2 * | 11/2006 | Okamoto et al. | 340/995.1 |
| 7,219,063 B2 | 5/2007 | Schalk et al. | |
| 7,227,475 B1 * | 6/2007 | Provenzano et al. | 340/995.24 |
| 7,441,192 B2 | 10/2008 | Pisz | |
| 7,552,063 B1 | 6/2009 | McEachern | |
| 8,050,817 B2 | 11/2011 | Moinzadeh et al. | |
| 8,335,709 B2 | 12/2012 | Todd et al. | |
| 2002/0049535 A1 * | 4/2002 | Rigo et al. | 701/211 |
| 2003/0050744 A1 * | 3/2003 | Saraiva | 701/1 |
| 2004/0193425 A1 | 9/2004 | Tomes | |
| 2005/0060219 A1 | 3/2005 | Deitering et al. | |
| 2007/0113243 A1 | 5/2007 | Brey | |
| 2007/0226041 A1 | 9/2007 | Oesterling et al. | |
| 2008/0051955 A1 | 2/2008 | Ross et al. | |
| 2009/0076915 A1 | 3/2009 | Tighe | |
| 2009/0094635 A1 | 4/2009 | Aslin et al. | |
| 2010/0023393 A1 | 1/2010 | Costy et al. | |

(Continued)

FOREIGN PATENT DOCUMENTS

| | | |
|---|---|---|
| EP | 1557810 | 7/2005 |
| EP | 2082190 | 7/2009 |

*Primary Examiner* — Tai T Nguyen
(74) *Attorney, Agent, or Firm* — Jennifer M. Stec; Brooks Kushman P.C.

(57) ABSTRACT

A system includes a vehicle processor configured to communicate with an intelligent street light to receive advertisements pertaining to local businesses. The processor is also configured to store a plurality of received advertisements. The processor is further configured to sort the advertisements based on one or more user factors. Also, the processor is configured to determine an appropriate time for advertisement delivery and deliver the advertisements at the appropriate time.

16 Claims, 4 Drawing Sheets

(56) References Cited

U.S. PATENT DOCUMENTS

| | | |
|---|---|---|
| 2010/0235739 A1 | 9/2010 | Rathi et al. |
| 2012/0243751 A1 | 9/2012 | Zheng et al. |
| 2012/0249343 A1 | 10/2012 | Thomas |
| 2012/0259541 A1 | 10/2012 | Downey et al. |
| 2012/0265616 A1 | 10/2012 | Cao et al. |
| 2013/0024287 A1 | 1/2013 | MacNeille et al. |

\* cited by examiner

METHOD AND APPARATUS FOR INTELLIGENT STREET LIGHT ADVERTISEMENT DELIVERY

TECHNICAL FIELD

The illustrative embodiments generally relate to a method and apparatus for intelligent street light advertisement delivery.

BACKGROUND

Smart street lighting and traffic control (SLATC) does more than simply shine light on the road. Infrastructure components include lampposts, traffic lights and signs and local web servers. Mobile components include personal vehicles, mass transit vehicles, goods vehicles, bicycles and pedestrians. SLATC devices are typically connected using power-line or wireless digital communication components, computational components, storage systems, sensors and actuators.

These components can communicate with each other using a gateway to a content delivery network. Communication interfaces allow the assembly of a digitally monitored, secure and reliable network where various smart sensors can monitor weather conditions, air pollution and lamppost inclination, satellite navigation corrections, vehicle location and velocity, etc. Networked street lighting systems can be managed via wired or wireless communications through any of several proven communication standards.

U.S. patent application 2012/0249343 generally relates to a system for intelligent transport communication including at least one transmitter, and at least one in-vehicle mobile receiver for use within a mobile road vehicle. The transmitter broadcasts, by wireless communication, dedicated data for each of a plurality of heading directions of the mobile road vehicle, on a corresponding plurality of multiplexed channels. The receiver receives the dedicated data on one of the multiplexed channels that corresponds to an actual heading direction of the mobile road vehicle. A multiple-redundant vehicle heading direction identification system for use within the mobile road vehicle includes a GPS direction identification system, a multiple digital compass system that identifies a heading direction of the mobile road vehicle based on input from multiple digital compasses, and a central processing unit that selects the heading direction produced by the GPS direction identification system only when an output of the GPS direction identification system is healthy U.S. Pat. No. 7,062,778 generally relates to a system comprising a number of transmitters spatially separated and transmitting different local information. A number of portable or mobile receivers adapted to receive transmitted information and provide this to a user, the receivers being adapted to inform the user about which transmitters are available and allow the user to select a transmitter. The information is transmitted via IR light, microwaves or radio waves.

SUMMARY

In a first illustrative embodiment, a system includes a vehicle processor configured to communicate with an intelligent street light to receive advertisements pertaining to local businesses. The processor is also configured to store a plurality of received advertisements. The processor is further configured to sort the advertisements based on one or more user factors. Also, the processor is configured to determine an appropriate time for advertisement delivery and deliver the advertisements at the appropriate time.

In a second illustrative embodiment, a system includes an intelligent street light associated processor configured to communicate with a vehicle to receive vehicle travel information, wherein the travel information includes at least a vehicle heading. The processor is also configured to select one or more advertisements for businesses ahead of a vehicle on a route in the direction of the heading and deliver the advertisements to the vehicle.

In a third illustrative embodiment, a computer-implemented method, executed by a street light associated processor, includes communicating with a vehicle to receive vehicle travel information, wherein the travel information includes at least a vehicle heading. The method also includes selecting one or more advertisements for businesses ahead of a vehicle on a route in the direction of the heading. Further, the method includes delivering the advertisements to the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
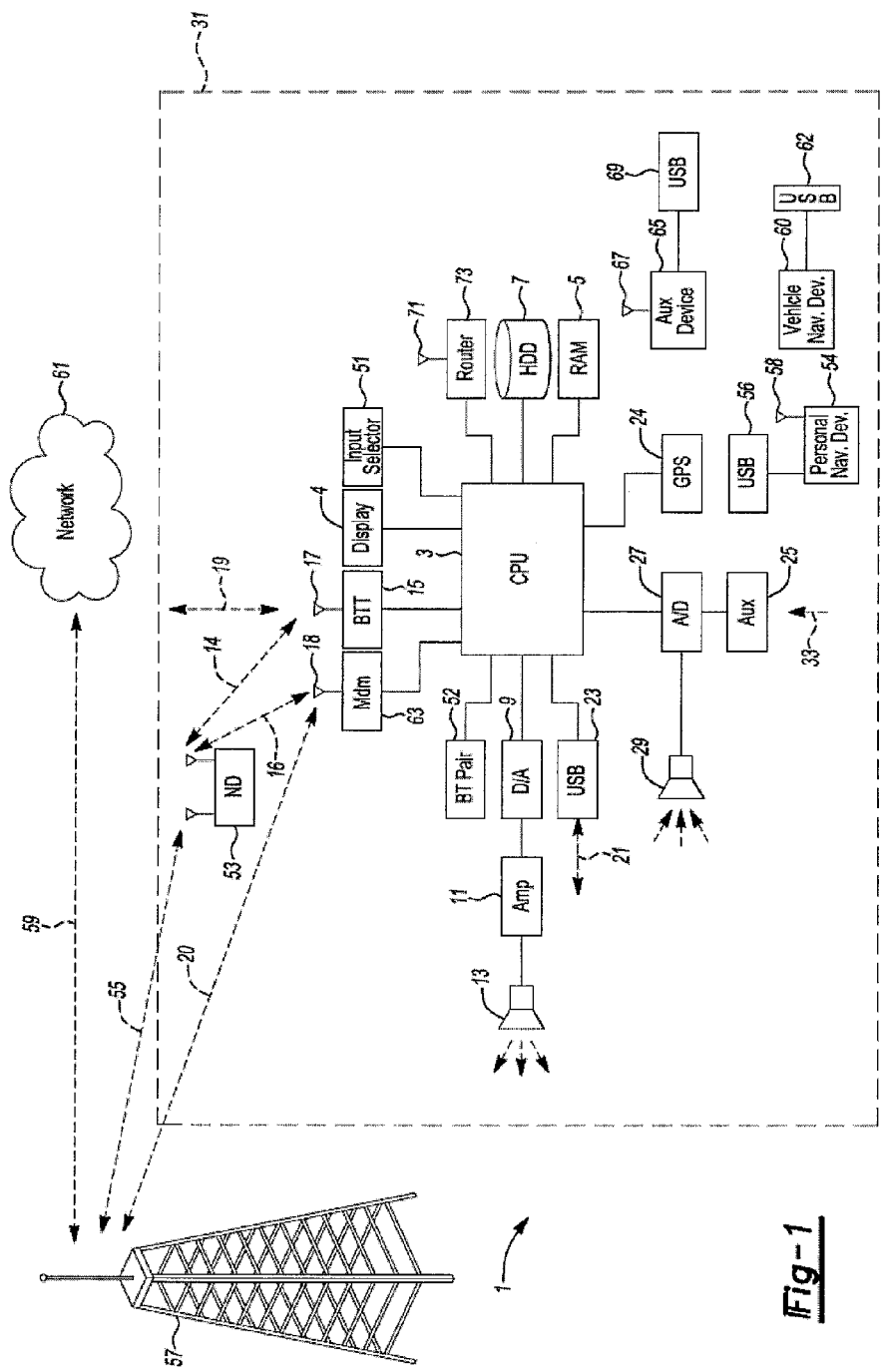
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

There are proven standards for communication between lampposts, traffic lights and vehicles containing a different set of communication devices, computers, sensors and actuators. Vehicles can also be geolocated more accurately and reliably than with GPS using standard wireless devices. In both wired and wireless cases, the communication is bi-directional, and the monitored system can send and receive information and commands to and from light posts. Thus, a distributed computing system includes the cloud, local servers, street lights and vehicles, complete with sensing, storage, networking, computation and human machine interfaces.

There are many capabilities of smart street lighting systems, for homeland security, public safety, traffic control, emergency services, parking and energy conservation that drive the development of these systems. The market for smart street lighting is expected to grow steadily over the remainder of this decade. Shipments of smart street lighting systems, will be under 200 worldwide for 2012, but is expected to reach more than 1,100 in 2020. Shipments of communications nodes, meanwhile, will rise from 550,000 this year to 4.8 million in 2020.

An SLATC in a shopping mall parking lot can provide navigation guidance to autonomous vehicles that drive themselves to a passenger pickup location when a cell phone application is activated. In a more current implementation of SLATC in a parking lot reduces the cost of electricity and security by lighting a small part of the lot and guiding vehicles to that location. For people that have been parked a long time and find their vehicle is far away in a dark parking lot, the lot can illuminate the walk to the vehicle by tracking the person's cell phone and lighting the path to the vehicle. A friendly implementation of limited time parking notifies a driver through a phone application that the parking time has expired, but may allow the person to renew the time on the parking space.

In the illustrative embodiments, a software device is proposed that implements novel vehicle advertising features to take advantage of the new mobile computational platform for vehicles including such modules as smart vehicle HMI systems and sensors. The device enables a "route 66" notion of travelers off the beaten trail with a car becoming involved with local communities rather than interstate highway rest stops. The device provides a technology that enables these types of interactions using a business/advertising model that puts the power of system analytics into the hands of "mom and pop" businesses that might ordinarily interact only with local customers. The system also works with people familiar with the area, encouraging them to experience new stores and businesses.

If cities make good use of the signals transmitted by vehicles, they can manage the traffic flow better and generate more revenue for local businesses. If an OEM's vehicles can integrate information from a local lighting system, drivers could plan their trips ahead and obtain deals from local businesses along their routes.

For example, if a user drives on a street they are not familiar with, smart lighting on that street might send them the information, advertisements or deals from the local businesses along the route (ahead of the driver, near the route, etc.). The signals from the lights can indicate deals, business locations and proximity to a driver location.

Signals sent from street lighting could also depend on the time of day, road conditions or current traffic conditions. Information can also be collected on a cluster basis and sent to a central service center, where the data is monitored and commands are initiated. Smart sensing technology linking a VCS can enhance driving safety to drivers and improve drivers' experiences in a new area.

SLATC infrastructure devices can be wireless vehicle access points to a server that interacts with local merchant browser clients and can interact with vehicle occupants through a VCS under a light using smart lighting and traffic control as a communication mechanism. The access point may discover a vehile's IP address and with permission enable the server to offer advertising media from local merchants. Communication may consist of media streams or downloads between the vehicle and the merchant server.

Networked infrastructure and mobile devices form a distributed computing system that is capable of running many different kinds of applications including chatterbots capable of delivering advertisements, surveys and promotional items such as coupons, as well as providing parking assistance, valet assistance and driver assistance. A chatterbot is software designed to simulate intelligent dialogue with humans auditory or textual methods.

A driver's likely path through an intersection can be predicted by lane detection with historical information (and route selection, when available) to select advertisements for establishments along the driver's path. Different advertisements delivered may be based on different times of day, headings, routes, traffic conditions, etc. If there are more than two occupants in a vehicle (which is detectable through vehicle sensors), the deals could be group oriented. Advertising may be delivered by the chatterbot at proper timing, such as only during a red light or when a driver is moving at sufficiently slow speeds.

Advertisement preferences are filtered by learning informational filters so that desirable advertisements are delivered. Ad delivery can be timed based on estimated travel time to a vendor. In heavy traffic, ads may be delivered more proximate to a vendor than in light traffic, since travel time to the vendor may be decreased in light traffic. Additionally, based on user responses, information can be delivered to the vendors so that the vendors may know how many people to possibly expect in the near future.

When the driver approaches an intersection, streetlights may start to send signals to approaching vehicles. The signals can correspond to information/advertisements/deals along the street. Local businesses advertised can be in the heading direction of the vehicles, rather than behind the vehicles. Once the drivers receive information, they can decide if they will take advantage of the offers.

Figure 2:
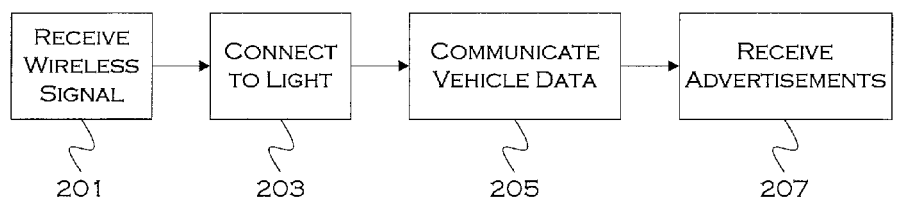
FIG. 2 shows an illustrative example of a content delivery process.

FIG. 2 shows an illustrative example of a content delivery process. In this illustrative example, a generalized version of content delivery is contemplated. The vehicle computing system receives a wireless signal indicating that a smart street light is present within wireless proximity to the vehicle 201. If advertisement delivery is appropriate/enabled, the VCS may then connect to the smart street light network 203.

Once the VCS has connected to the smart street light network, the system may communicate vehicle data to the street light system 205. This can include occupant data, vehicle speeds, heading and location information. Other information may relate to occupant advertisement preferences. If the street light system sorts out the advertisements in advance, the system can use this information to select advertisements for delivery. Otherwise the system may delivery a block of advertisements and the VCS can select particular advertisements for delivery once the VCS has received the advertisements 207.

Figure 3:
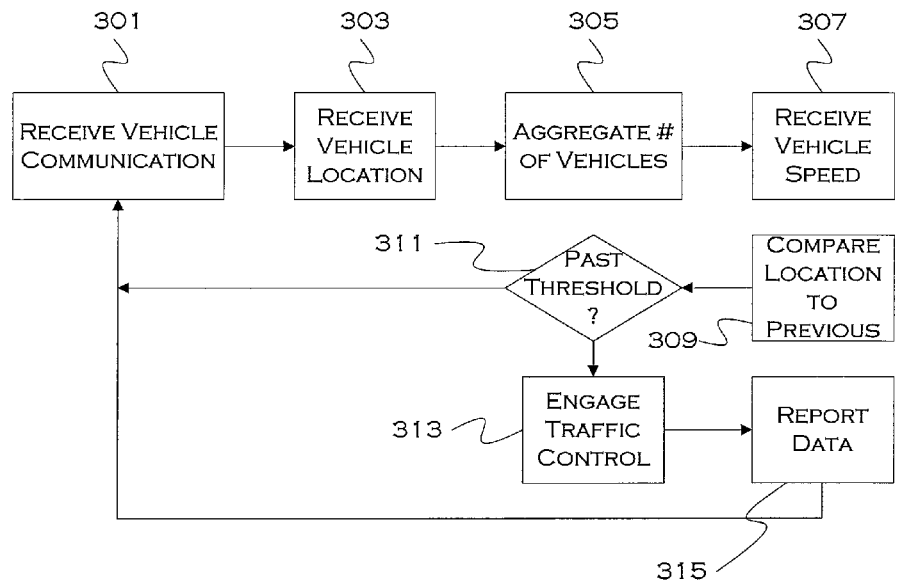
FIG. 3 shows an illustrative example of a traffic control process.

FIG. 3 shows an illustrative example of a traffic control process. In this illustrative example, an intelligent street light network receives vehicle communication 301. This communication can identify the vehicle, and, if desired, can include information about a vehicle and/or vehicle occupants. In this illustrative example, the process receives information relating to a vehicle location for each vehicle that transmits data to the light 303. This information can provide useful elements for the street light system. By aggregating a number of vehicles communicating with the system 305, the system can estimate a rough snapshot of traffic at a given time (especially if a minimum number of signals are received). For each vehicle, the traffic light system may also receive speed data 307, which can be compared against known speed limits to determine how quickly traffic is moving in a given direction.

Vehicle locations can also be compared to previous locations of the same vehicle 309. For example, if a vehicle is traveling at 0 miles per hour, and information is received about three different locations of this vehicle at this speed, the traffic system can estimate how many vehicles are progressing through a light during a given cycle. It may be the case that traffic is inordinately backed up in a certain direction. If the movement is below a threshold tolerance 311, and especially if there is limited cross traffic detected (indicating that there is no need for long green lights in that direction), the process may engage a traffic control, such as a light 315 to facilitate traffic movement in the slowed direction. Traffic data can also be reported to a central system 313, so that future traffic controls may be better set to facilitate traffic flow.

Figure 4:
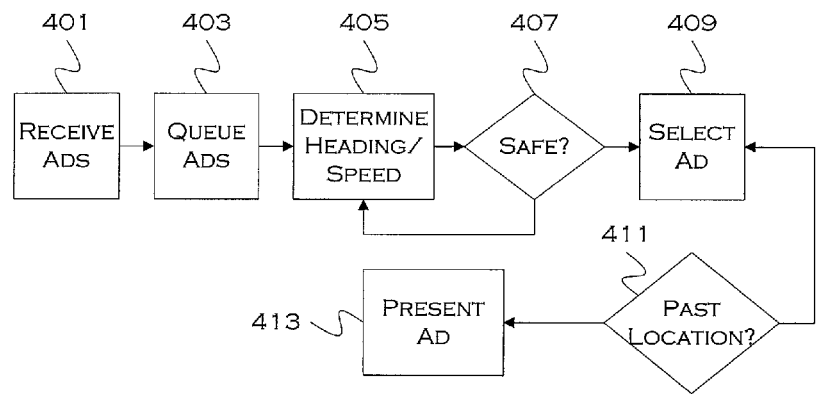
FIG. 4 shows an illustrative example of an advertisement provision process.

FIG. 4 shows an illustrative example of an advertisement provision process. In this illustrative example, a vehicle processor receives advertisements from an intelligent street light 401. In this illustrative example, the vehicle processor is in charge of determining when an advertisement should be delivered. This removes some burden from the street lights, since they don't have to track optimal delivery times for each vehicle, and can instead deliver advertisements that are likely to be relevant.

In this illustrative example, the processor queues the advertisements as they are received 403. Since the processor will deliver the ads, it stacks up the ads as they are sent in from the street light system. The processor is also responsible for determining a heading and/or a speed of a vehicle 405, which may also be relevant for advertisement delivery, since it may be desirable only to delivery advertisements ahead of a vehicle along a route.

Once it is safe to deliver an advertisement 407 (e.g., the vehicle is moving at a low speed or stopped), the process will select an advertisement for delivery 409. In some illustrative embodiments, the advertisement will be selected based on user preferences, time of day, and other contextual information. Alternatively, a FIFO, LIFO or random selection can be made. In this example, there may only be a few ads present, so the only criteria is whether or not the vehicle has passed the location to which the adverisment applies 411. If the vehicle has not passed the location, the process presents the ad 413.

Figure 5A:
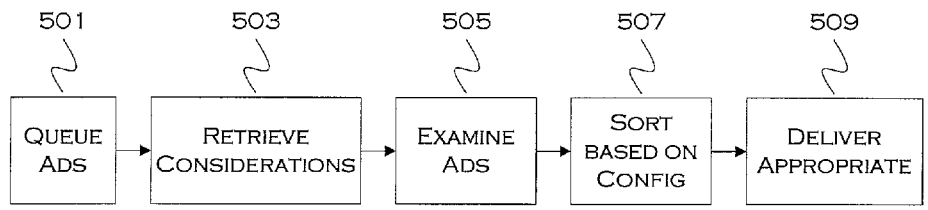
FIGS. 5A and 5B shows illustrative examples of an advertisement selection process.
Figure 5B:
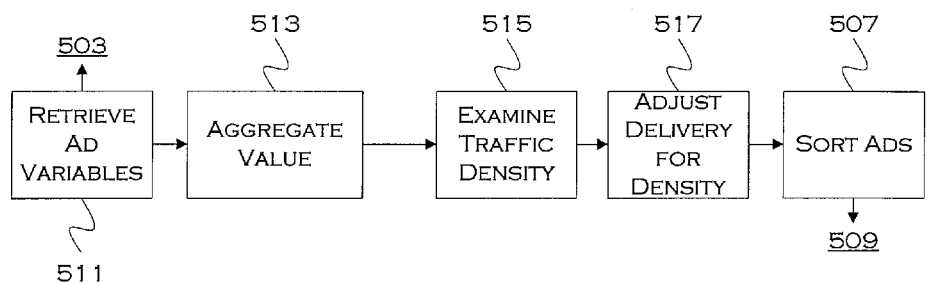

FIGS. 5A and 5B shows illustrative examples of an advertisement selection process. In this illustrative example, additional considerations are used for the process of advertisement selection. The process queues up received advertisements once again 501, so that the queued advertisements can be used for selection of an advertisement for delivery. Once the advertisements are queued, the process retrieves a set of considerations to apply to the ads 503. These can include, but are not limited to, number of users, time of day, observed user preferences, volume of traffic, lane of user, proximity to merchant and many other factors.

Using the retrieved considerations, the process examines the advertisements 505 to select based on a current configuration correspondence to a set of considerations 507. The advertisements may be sorted in this example, so that they are placed in an order appropriate for delivery (although a re-sort may be needed as the vehicle passes certain merchants). Once the ads have been selected and/or sorted, the process delivers an appropriate advertisement to the vehicle driver 509.

FIG. 5B shows the selection process adjusted for traffic volume. In this illustrative example, variables associated with each advertisement are received. These can include, for example, classifications, time of day correlations, optimal weather correlations, etc. For example, if the variables are assigned values ranging from −1 to 1, a McDonalds advertisement, around lunch time, may receive a 1 for being "food" (since it is lunch time), a 0.8 for being "user preferred food", and a 0.4 for being seven miles away. Thus an aggregated value of 2.2 may be assigned 513. Similarly, an ice cream store may receive a 0.5 for being a "snack", a 0.3 for being "user sometimes enjoys", a 0.9 for being 0.5 miles away, and a −0.7 because it is only 50 degrees outside. Thus, an aggregated value of 1 may be assigned. But, if heavy traffic is present, the system may consider that it could take 20-25 minutes to reach the McDonalds, and only 3 minutes to reach the ice cream. If a scale of 1-10 miles is used in light traffic, and 1-5 miles is used in heavy traffic, the McDonalds ad, at this time, might be ignored entirely. If the heavy traffic scale was 1-10 miles (it can vary as appropriate for a situation), with a multiplier of (1-0.1*distance) then a multiplier of 0.95 would be used with the ice cream store and a multiplier of 0.3 would be used with the McDonalds, resulting in a higher value for the ice cream store. The McDonalds ad may still be played, especially as the vehicle approaches the store and the value rises, but at this instant moment the ice cream store ad would be played first.

This is just one illustrative example of how a weighting system can be applied to the ads. Any suitable weighting system may be utilized. Traffic density is examined 515 and an adjustment is made for traffic density 517 before the ads are sorted 507. This adds another wrinkle to the sorting process that accounts for likely travel time, and further encourages local stops in high traffic, as very proximate businesses may be promoted, and a user may be tired of sitting in traffic anyhow. In other examples, estimated time to a vendor can be used in addition to or instead of the distance to a vendor, to the same end.

Since multiple street lights may be present for delivery, traffic conditions may be measured with respect to each street light. For example, if a maximum coupon range is ten miles, then traffic density within ten miles of the street light may be considered. Of course, delivery of coupons is likely limited to a much shorter range, so traffic density may be measured within a much smaller perimeter, that is less than the maximum consideration range for coupons.

Figure 6:
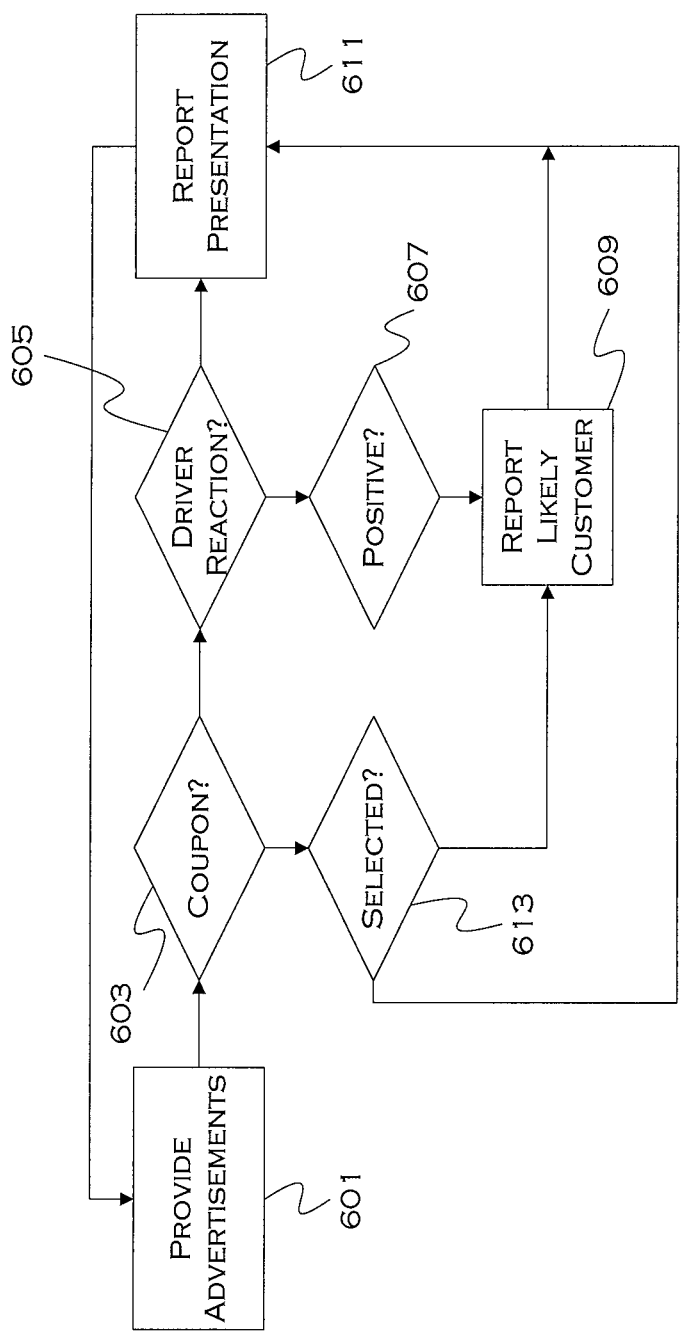
FIG. 6 shows an illustrative example of an advertisement tracking process.

FIG. 6 shows an illustrative example of an advertisement tracking process. In this illustrative example, the process reports likely customers to merchants so the merchant is not overwhelmed by the response to a coupon, for example. The advertisements are provided by the VCS 601, and, in this example, may include a coupon 603. If there is no coupon, the system may still be able to gauge user interest by examining visual or verbal cues, such as evidenced in a driver reaction 605. If there is no measurable driver reaction, or if such capability is beyond the vehicle, the process may merely report that the ad was delivered 611. Even from mere delivery reporting, it may be possible for a merchant to extrapolate some sense of possible upcoming customers.

If there is a coupon delivered, and the customer selects the coupon for digital delivery 613, the merchant may be notified that a customer selected the coupon 609. Similarly, if there is a responsive visual or audible cue 605 associated with a positive reaction 607, the process may also report a likely customer 609. When such indicia are not present, the process again may simply report delivery of the advertisement.

Through these and other similar systems and methods, utilization of smart lighting can be performed to deliver targeted advertisements relating to local businesses. If the city derived some revenue from this process, the cost of the lighting itself may be covered over time, encouraging integration of the systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a transceiver; and
a vehicle processor, in communication with the transceiver, configured to:
communicate with an intelligent street light, via the transceiver, to receive advertisements pertaining to local businesses;
store a plurality of received advertisements;
sort the advertisements based on an observed traffic volume, such that advertisements are given increased preference based on proximity to a vehicle as traffic volume increases; and
deliver the advertisements at a determined appropriate delivery time.

2. The system of claim 1, wherein the advertisements are sorted based on observed user preferences.

3. The system of claim 1, wherein the advertisements are sorted based on time of day.

4. The system of claim 1, wherein the advertisements are sorted based on proximity to the vehicle.

5. The system of claim 1, wherein only advertisements for businesses located in a direction which a vehicle is traveling are sorted and delivered.

6. The system of claim 1, wherein the proximity includes a physical proximity.

7. The system of claim 1, wherein the proximity includes a temporal proximity.

8. The system of claim 1, wherein, if a vehicle passes a business for which an advertisement is stored, but has not been delivered, the processor is configured to ignore the advertisement.

9. A system comprising:
a transceiver; and
an intelligent street light associated processor configured to:
communicate with a vehicle, via the transceiver, to receive vehicle travel information, wherein the travel information includes at least a vehicle heading;
select one or more advertisements for businesses ahead of a vehicle on a route in the direction of the heading;
aggregate travel information from a plurality of vehicles traveling in a same direction to determine traffic density; and
deliver the advertisements to the vehicle.

10. The system of claim 9, wherein the processor is further configured to receive a vehicle speed.

11. The system of claim 9, wherein advertisements for businesses proximate to a street light including the intelligent street light associated processor are given increasing selection preference as traffic density increases within a predetermined area around the street light.

12. The system of claim 11, wherein proximity is measured in distance.

13. The system of claim 11, wherein proximity is measured in estimated time.

14. The system of claim 11, wherein the intelligent street light associated processor is configured to recognize a high traffic condition and instruct adjustment of at least one street light cycle to reduce traffic congestion if a high traffic condition is detected.

15. The system of claim 9, wherein the intelligent street light associated processor is further configured to receive information relating to the delivery of a specific advertisement from a vehicle, and to provide the information to a merchant to which the advertisement corresponds.

16. The system of claim 15, wherein the information includes a notification that a driver downloaded a coupon included with the specific advertisement.

* * * * *